(12) United States Patent
Kim

(10) Patent No.: US 7,340,757 B2
(45) Date of Patent: Mar. 4, 2008

(54) TURNTABLE AND OPTICAL DISC DRIVER HAVING THE SAME

(75) Inventor: Yong Tae Kim, Gwangjoo-si (KR)

(73) Assignee: LG Innotek Co., Ltd., Seoul (KR)

( * ) Notice: Subject to any disclaimer, the term of this patent is extended or adjusted under 35 U.S.C. 154(b) by 183 days.

(21) Appl. No.: 11/219,697

(22) Filed: Sep. 7, 2005

(65) Prior Publication Data

US 2006/0064712 A1 Mar. 23, 2006

(30) Foreign Application Priority Data

Sep. 7, 2004 (KR) ...................... 10-2004-0071183

(51) Int. Cl.
*G11B 17/022* (2006.01)
(52) U.S. Cl. .................................... 720/706
(58) Field of Classification Search ................ 720/706, 720/604, 704, 712; 369/270, 270.1; 360/98.08, 360/99.05, 99.12
See application file for complete search history.

(56) References Cited

U.S. PATENT DOCUMENTS 4,737,948 A * 4/1988 Okita .......................... 720/712
5,555,233 A * 9/1996 Yano et al. .................. 720/709
5,761,186 A * 6/1998 Mushika et al. ............. 720/704
7,055,156 B2 * 5/2006 Chuang et al. .............. 720/604
2002/0044521 A1 * 4/2002 Sogawa et al. .............. 369/270

FOREIGN PATENT DOCUMENTS

KR 20-1999-0017931 6/1999

* cited by examiner

*Primary Examiner*—Tianjie Chen
(74) *Attorney, Agent, or Firm*—Birch, Stewart, Kolasch & Birch, LLP

(57) ABSTRACT

There is provided a turntable and an optical disc driver. The turntable includes an assembly groove into which a clamp plate is inserted and at least one fixing jaws formed in the assembly groove to be fastened to the clamp plate. The optical disc driver includes a clamp plate including at least one fastening holes formed on the circumference thereof and fixing protrusions formed in the fastening holes and a turntable including an assembly groove into which the clamp plate is inserted and at least one fixing jaws formed in the assembly groove to be fastened to the fixing protrusions of the clamp plate.

15 Claims, 13 Drawing Sheets

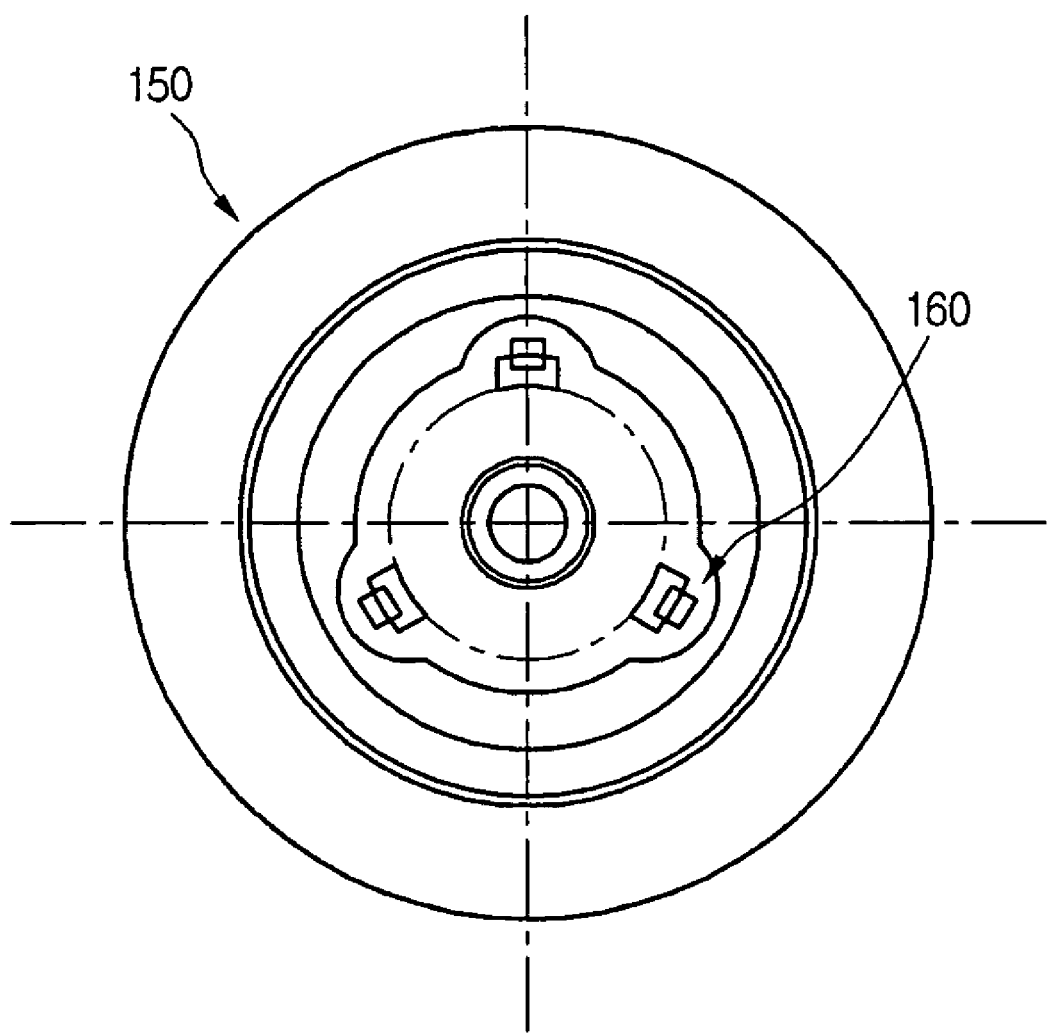

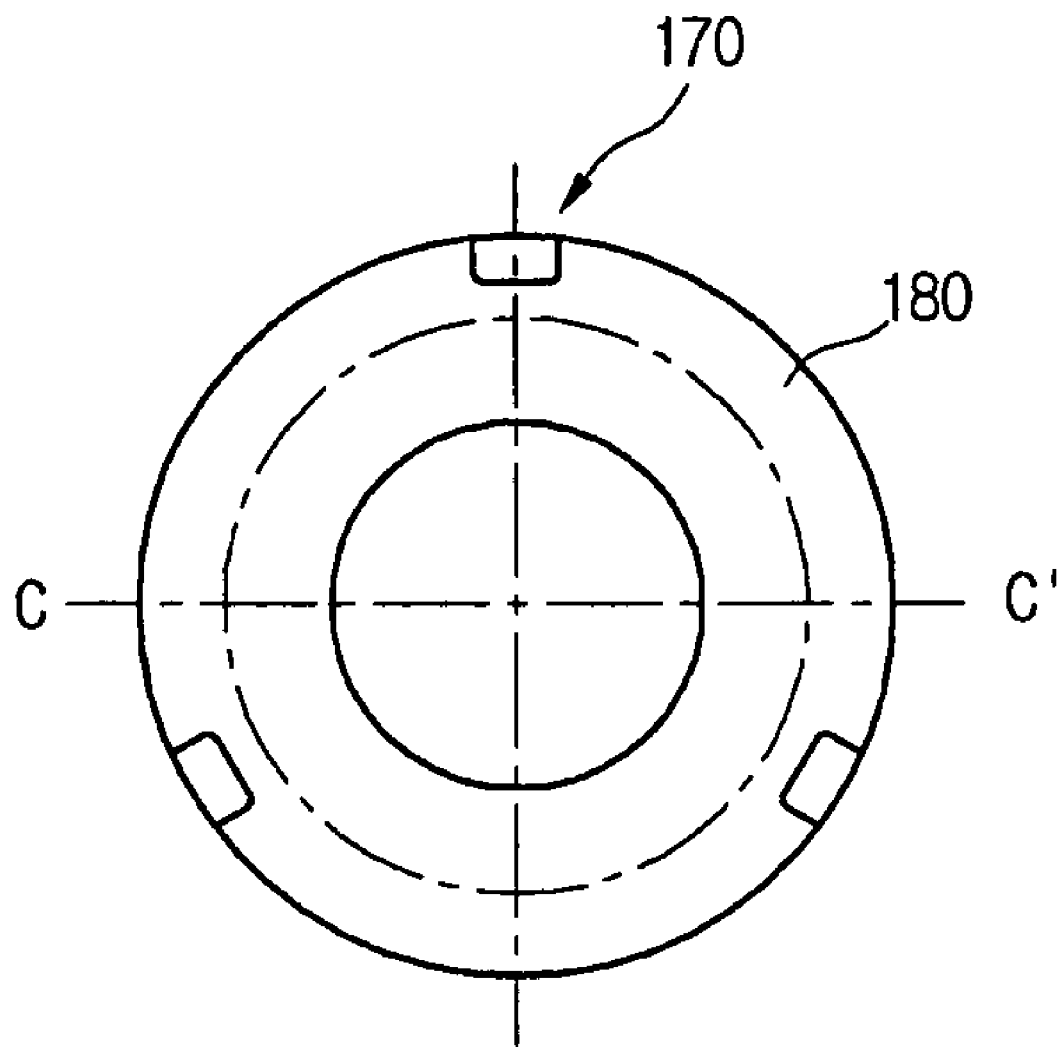

TURNTABLE AND OPTICAL DISC DRIVER HAVING THE SAME

BACKGROUND OF THE INVENTION

1. Field of the Invention

The present invention relates to an optical disc driver.

2. Description of the Related Art

Optical recording media for digitalizing a large amount of information to record or reproduce the digitalized information have been developed according as an information-oriented society has arrived. Among them, compact discs (CD) and digital versatile discs (DVD) are commonly used.

The information stored in the optical recording media can be reproduced using the optical disc drivers. The optical disc drivers repeatedly load the optical recording media in turntables and unload the optical recording media from turntables in order to record information in or to reproduce information from the optical recording media.

The optical disc drivers clamp the loaded optical recording media, for example, optical discs in the turntables and/or eject the loaded optical recording media, for example, optical discs from the turntables. That is, when the optical recording media are loaded on the turntables, the optical recording media are clamped while the recording or reproducing operation is performed. When information is recorded in or reproduced from the optical recording media, clamping is released and the optical recording media are unloaded from the turntables. The optical disc driver includes a spindle motor for rotating the turntable. A clamp plate for performing a clamping function is combined with the turntable.

FIGS. 1A and 1B schematically illustrate a related art clamp plate. FIGS. 2A and 2B schematically illustrate a related art turntable. FIG. 3 illustrates a state in which the clamp plate illustrated in FIGS. 1A and 1B and the turntable illustrated in FIGS. 2A and 2B are combined with each other.

As illustrated in FIGS. 1A and 1B, a related art clamp plate 10 is donut-shaped and a plurality of fastening holes 1 are formed along the circumference. The fastening holes 1 are formed to correspond to the fastening protrusions 22 formed in the turntable 20 (refer to FIGS. 2A and 2B). Since the section of the clamp plate 10 taken along the line A-A' is donut-shaped, the center of the clamp plate 10 is opened.

The fastening holes 1 are formed on the circumference of the clamp plate 10. The diameter of the lower parts of the fastening holes 1 is narrower than the diameter of the upper parts of the fastening holes 1 so that the fastening protrusions 22 formed in the turntable 20 do not come out of the fastening holes 1 after the fastening protrusions 22 are assembled with the fastening holes 1.

Also, as illustrated in FIGS. 2A and 2B, the fastening protrusions 22 and an assembly groove 21 are formed in the related art turntable 20. The rotation shaft of a spindle motor (not shown) is fastened to the center of the turntable 20 so that the turntable 20 rotates in accordance with the rotation of the spindle motor.

The assembly groove 21 with which the clamp plate 10 described with reference to FIGS. 1A and 1B can be assembled is formed in the center of the turntable 20. The fastening protrusions 22 assembled with the fastening holes 1 of the clamp plate 10 are formed in the assembly groove 21.

As illustrated in FIG. 3, the clamp plate 10 is inserted into the circular assembly groove 21 formed in the turntable 20 to be combined with the assembly groove 21. At this time, the fastening protrusions 22 formed in the region of the assembly groove 21 of the turntable 20 are combined with the fastening holes 1 formed in the clamp plate 10.

At this time, in order to combine the clamp plate 10 with the turntable 20, after loading the clamp plate 10 in supersonic wave fusion equipment, the clamp plate 10 is fused in the turntable 20 to be assembled with the turntable 20.

However, when the turntable 20 and the clamp plate 10 are assembled by the supersonic wave fusion process, the following problems occur. Due to deviation in the heights of the fastening protrusions 22 formed in the turntable 20, the fusion power applied to the fastening protrusions 22 varies during the supersonic wave fusion so that defects in assembly are generated.

That is, when large fusion power is applied since the heights of the fastening protrusions 22 are high, the fastening protrusions 22 may be damaged. To the contrary, when the heights of the fastening protrusions 22 are low, the clamp plate 10 is not fastened to the turntable 20.

Also, the supersonic wave fusion equipment generates heat by the vibration of a horn with a uniform frequency to assemble the fastening protrusions 22 with the clamp plate 10. At this time, the clamp plate 10 contacts the horn to abrade and deform the horn.

The abrasion and deformation of the horn deteriorates the fusion power of the clamp plate 10 and the turntable 20. In order to prevent the fusion power of the clamp plate 10 and the turntable 20 from deteriorating, the state of the horn must be periodically examined.

On the other hand, FIGS. 4A to 4C illustrate a clip-shaped turntable and a clamp according to a related art.

As illustrated in FIGS. 4A to 4C, a clip unit 160 is formed in the related art clip-shaped turntable 150. A fastening unit 170 is formed in the clamp plate 180 corresponding to the clip unit 160. Therefore, the clamp plate 180 is fastened to the clip unit 160 of the clip-shaped turntable 150.

The center of the turntable 150 is fixed to the rotation shaft of the spindle motor. The triangular clip unit 160 is formed in the center of the turntable 150 so that the clamp plate 180 can be assembled.

As illustrated in FIG. 4C, the fastening unit 170 is formed on the top surface of the clamp plate 180. The fastening unit 170 formed in the clamp plate 180 is inserted into the clip unit 160 formed in the turntable 150 to be fastened to the clip unit 160.

That is, when the clamp plate 180 is pressed to the clip unit 160 formed in the turntable 150, the fastening unit 170 of the clamp plate 180 is inserted into the clip unit 160 to be fastened to the clip unit 160.

However, the structure in which the turntable 150 is assembled with the clamp plate 180 by the clip unit 160 has the following disadvantages. Since the clip unit 160 is formed in the body of the turntable 150 where the optical recording medium, for example, an optical disc rotates, the rotating optical disc is caught by a burr when the burr is provided in a product.

Also, when the clamp plate 180 is fastened to the turntable 150, the clip unit 160 may be deformed and noise may be generated when fastening power deteriorates due to frequent fastening operations.

SUMMARY OF THE INVENTION

Accordingly, an object of the present invention is to solve at least the problems and disadvantages of the related art.

It is an object of the present invention to provide a turntable capable of being easily assembled with a clamp plate and of improving fastening power and an optical disc driver using the same.

In order to achieve the above object, there is provided a turntable comprising an assembly groove into which a clamp plate is inserted and at least one fixing jaws formed in the assembly groove to be fastened to the clamp plate.

There is also provided an optical disc driver comprising a clamp plate including at least one fastening holes formed on the circumference thereof and fixing protrusions formed in the fastening holes and a turntable including an assembly groove into which the clamp plate is inserted and at least one fixing jaws formed in the assembly groove to be fastened to the fixing protrusions of the clamp plate.

BRIEF DESCRIPTION OF THE DRAWINGS

The present invention will be described in detail with reference to the following drawings in which like numerals refer to like elements.

FIGS. 4A to 4C illustrate a clip-shaped turntable and a clamp plate according to a related art.

DETAILED DESCRIPTION OF PREFERRED EMBODIMENTS

Preferred embodiments of the present invention will be described in a more detailed manner with reference to the drawings.

Figure 1A:
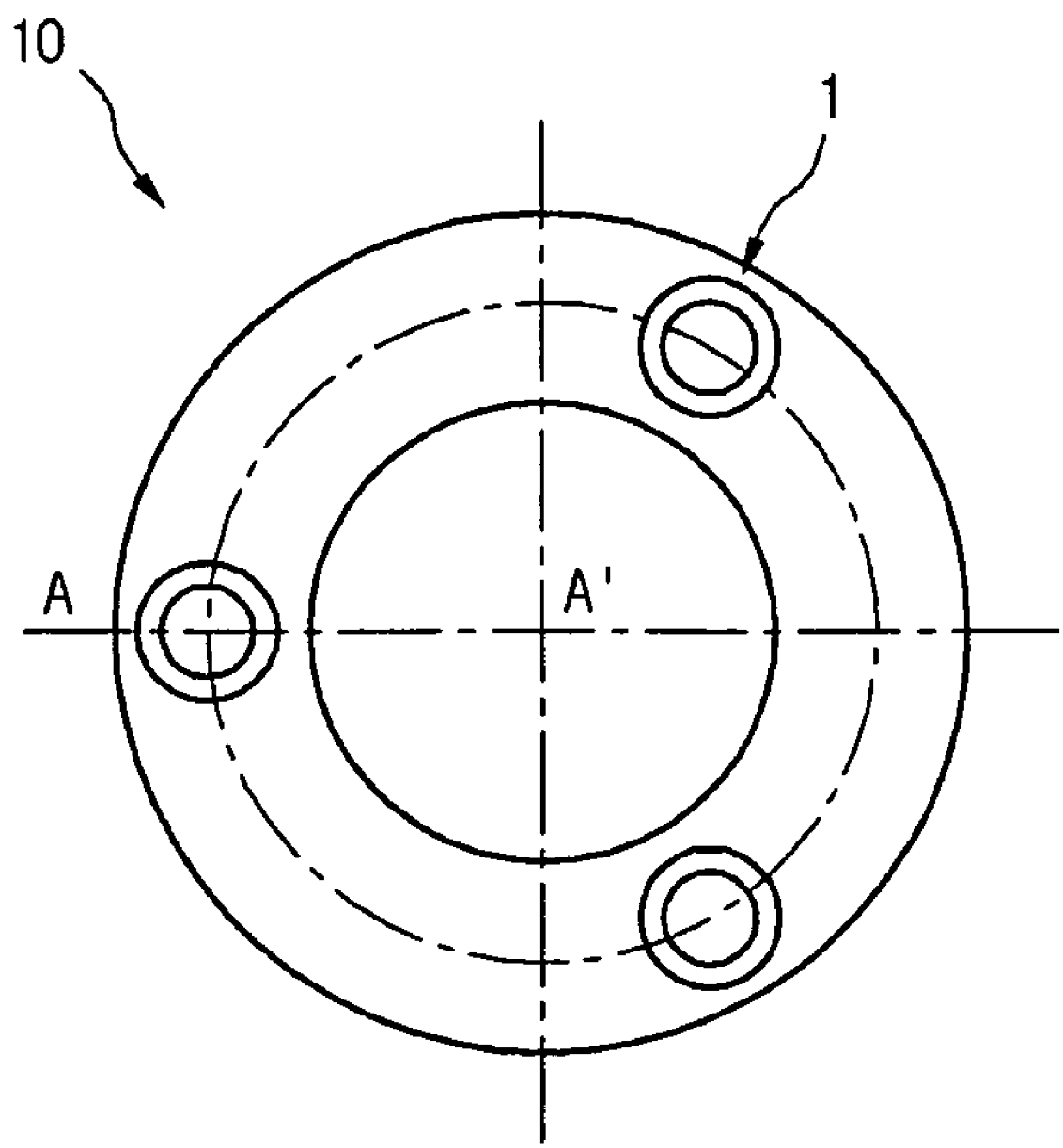
FIGS. 1A and 1B schematically illustrate a related art clamp plate.
Figure 1B:
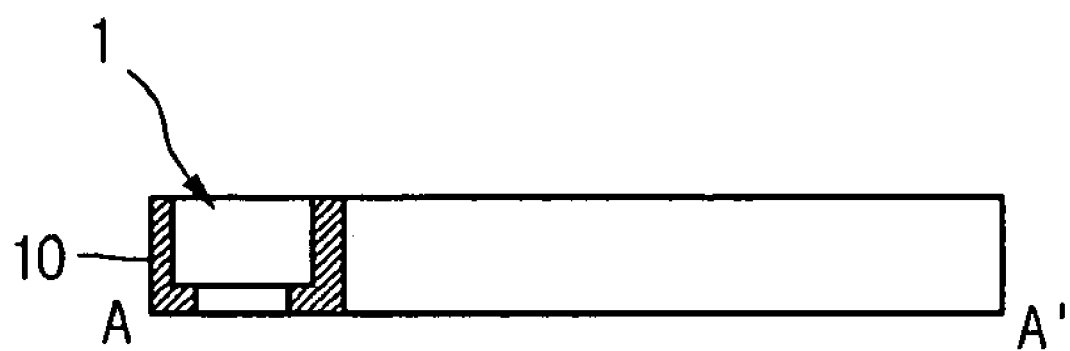
Figure 2A:
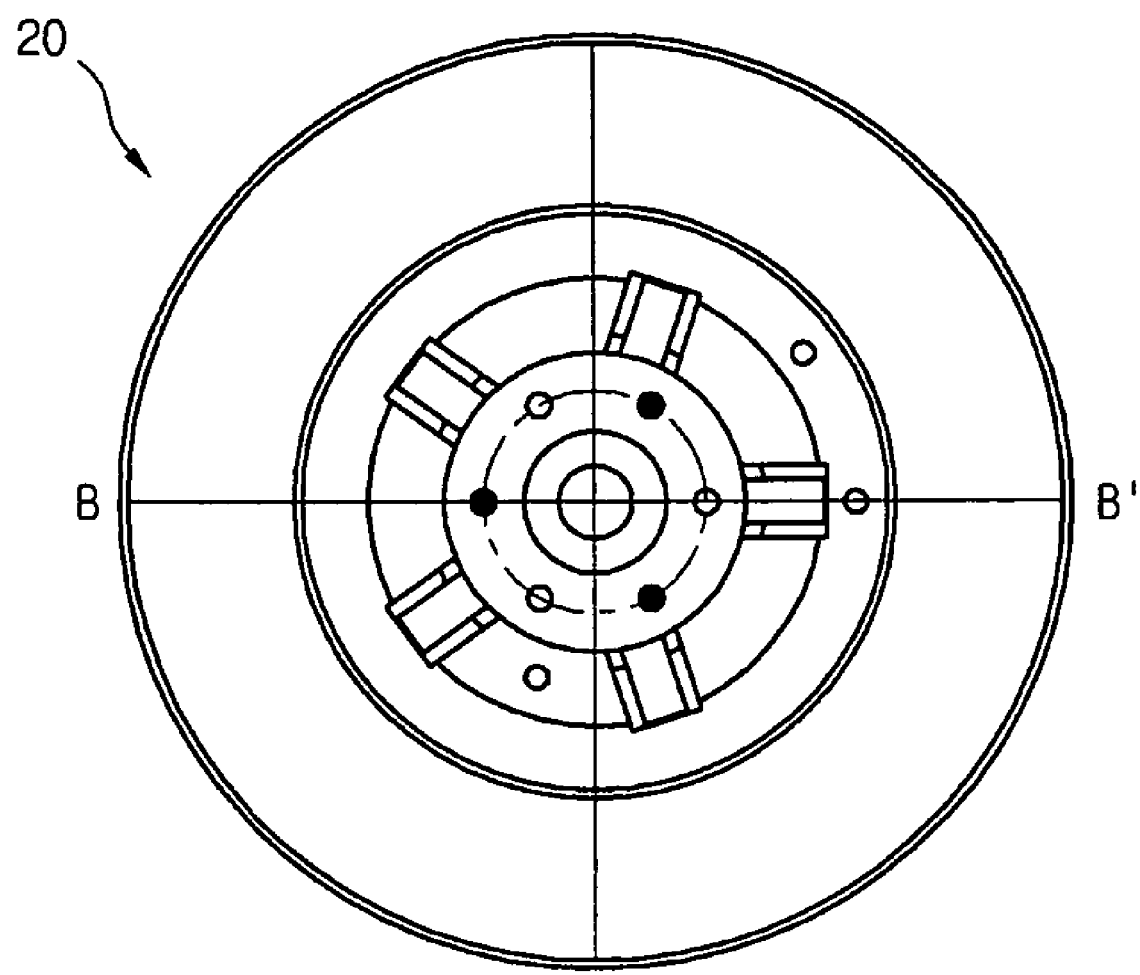
FIGS. 2A and 2B schematically illustrate a related art turntable.
Figure 2B:
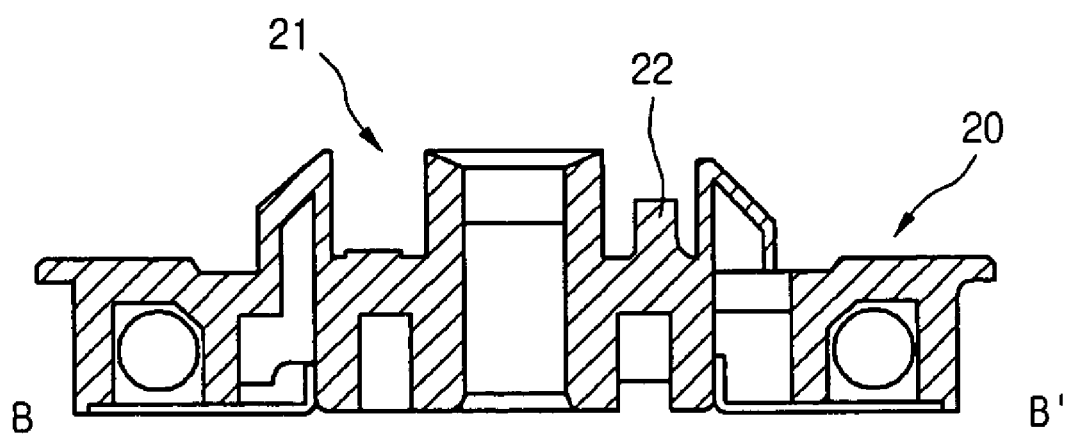
Figure 3:
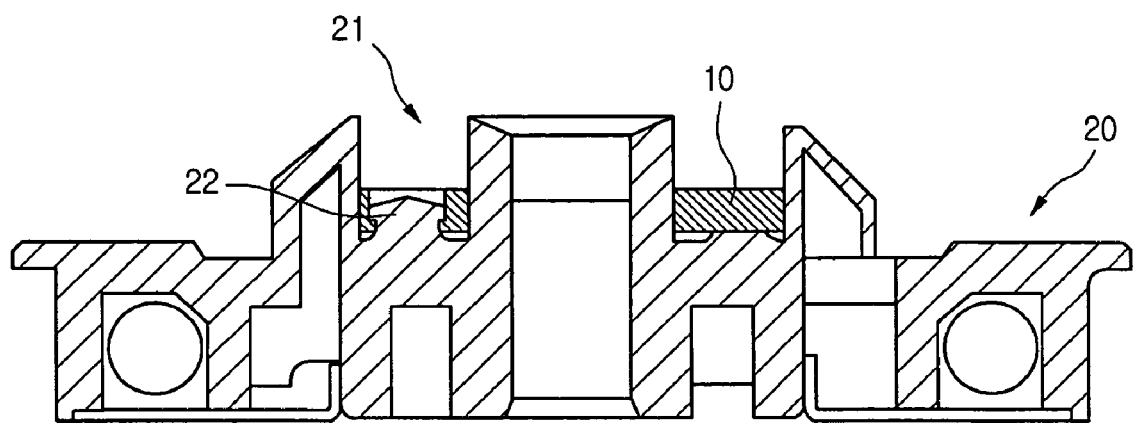
FIG. 3 illustrates a state in which the clamp plate illustrated in FIGS. 1A and 1B and the turntable illustrated in FIGS. 2A and 2B are combined with each other.
Figure 4C:
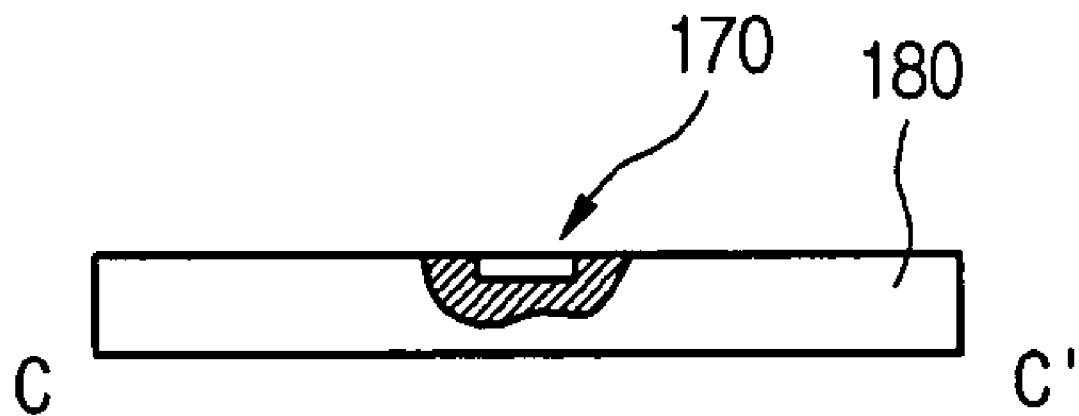
Figure 5A:
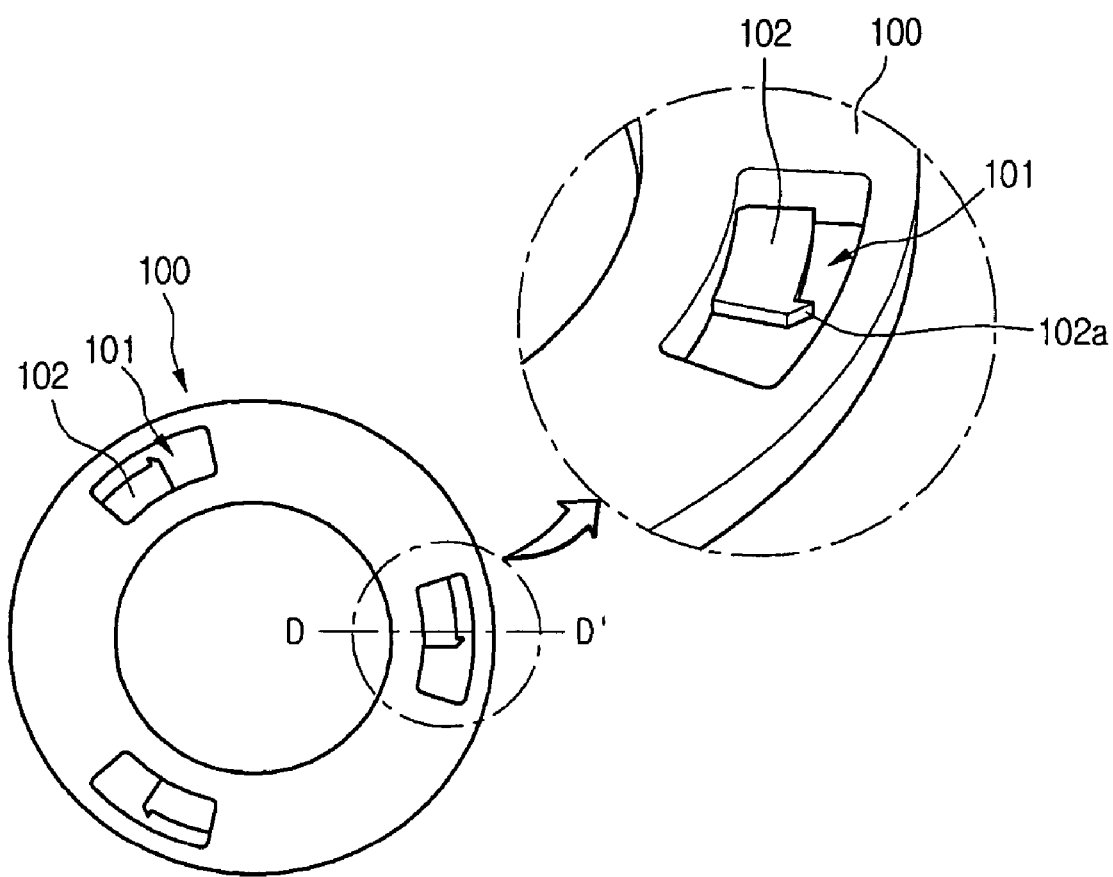
FIGS. 5A and 5B schematically illustrate a clamp plate applied to an optical disc driver according to the present invention.
Figure 5B:
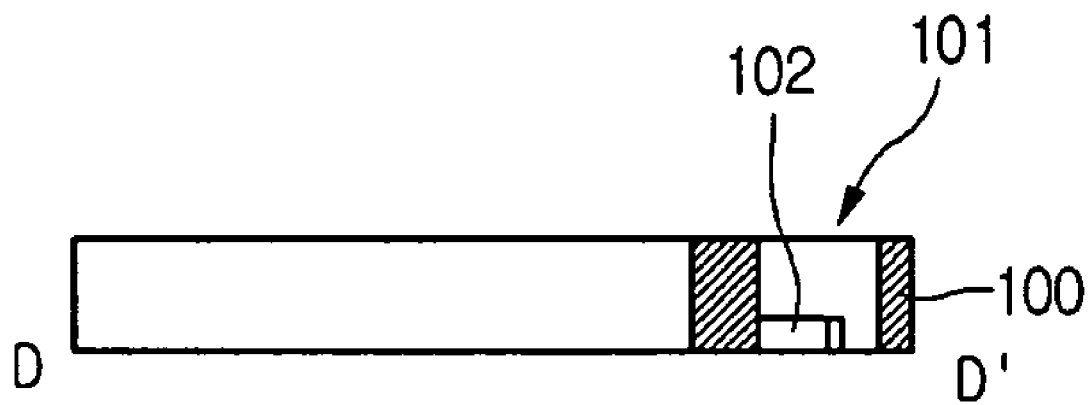
Figure 6A:
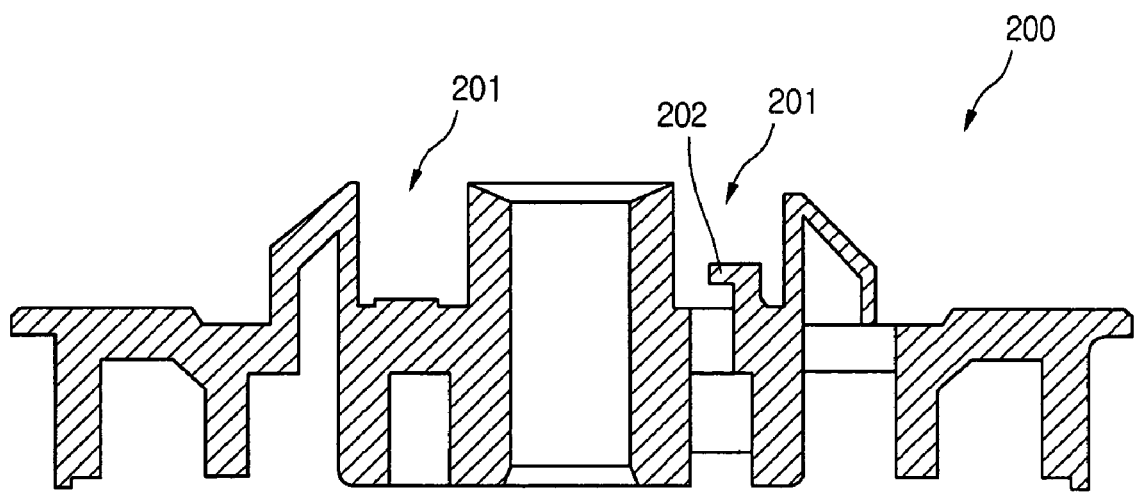
FIGS. 6A and 6B schematically illustrate a turntable applied to the optical disc driver according to the present invention.
Figure 6B:
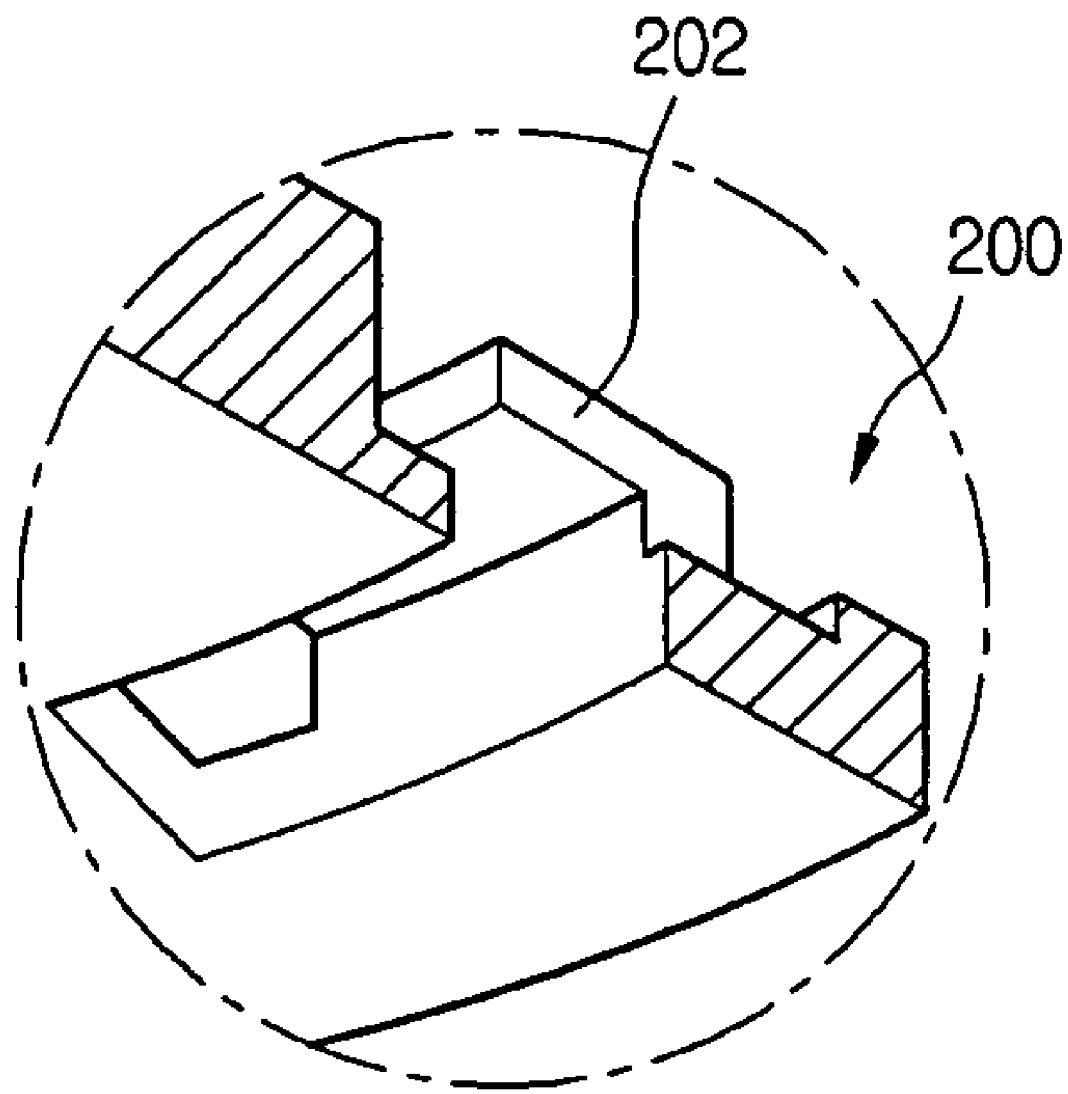

FIGS. 5A and 5B schematically illustrate a clamp plate applied to an optical disc driver according to the present invention. FIGS. 6A and 6B schematically illustrate a turntable applied to the optical disc driver according to the present invention.

As illustrated in FIGS. 5A and 5B, fastening holes 101 and fixing protrusions 102 are formed in a clamp plate 100 according to the present invention. The number of fastening holes 101 and fixing protrusions 102 is no less than one. A protruding unit 102a is formed at one edge of the fixing protrusion 102. The clamp plate 100 and the fixing protrusions 102 are integrated with each other. The clamp plate 100 is donut-shaped and the fastening holes 101 are formed along the circumference of the clamp plate 100.

The plurality of fastening holes 101 are formed along the circumference of the clamp plate 100. The fixing protrusions 102 integrated with the clamp plate 100 are formed in the fastening holes 101.

As illustrated in FIG. 5A, when the region in which the fixing protrusion 102 is formed is enlarged, the fastening hole 101 formed along the circumference of the clamp plate 100 has predetermined curvature along the direction of the circumference of the clamp plate 100.

The fixing protrusion 102 is formed in the fastening hole 101 in accordance with the curvature of the fastening hole 101. The fixing protrusion 102 is formed to be shorter than the fastening hole 101.

Also, the protruding unit 102a is formed at one edge of the fixing protrusion 102 so that the protruding unit 102a is fastened to the fixing jaw 202 formed in the region of the assembly groove 201 when the clamp plate 100 is assembled with the turntable 200 illustrated in FIG. 6A.

As illustrated in FIGS. 6A and 6B, the assembly groove 201 into which the clamp plate 100 is inserted and the fixing jaws 202 fastened to the fixing protrusions 102 of the clamp plate 100 are formed in the turntable 200. The rotation shaft of the spindle motor is fixed in the center of the turntable 200 so that the turntable 200 rotates in accordance with the rotation of the spindle motor.

The assembly groove 201 is formed in the turntable 200 so that the clamp plate 100 described with reference to FIGS. 5A and 5B can be assembled with the turntable 200. Also, at least one fixing jaws 202 corresponding to the fastening holes 101 formed in the clamp plate 100 to be assembled with the fastening holes 101 are formed in the assembly groove 201. The assembly hole 201 may be ring-shaped and the plurality of fixing jaws 202 may be distributed on the circumference of the ring-shaped assembly groove 201 at a uniform angle.

FIG. 6B illustrates an enlargement of the fixing jaw 202 seen from the bottom surface toward upper part. Here, the fixing jaw 202 may be ¬-shaped. The fixing jaw 202 has predetermined curvature to be fastened to the fixing protrusion 102 formed in the clamp plate 100. And the fixing jaw 202 may be formed in various types. For example, the fixing jaw 202 may be formed in hook-shaped type in accordance to the type of the fixing protrusions 102.

Figure 7:
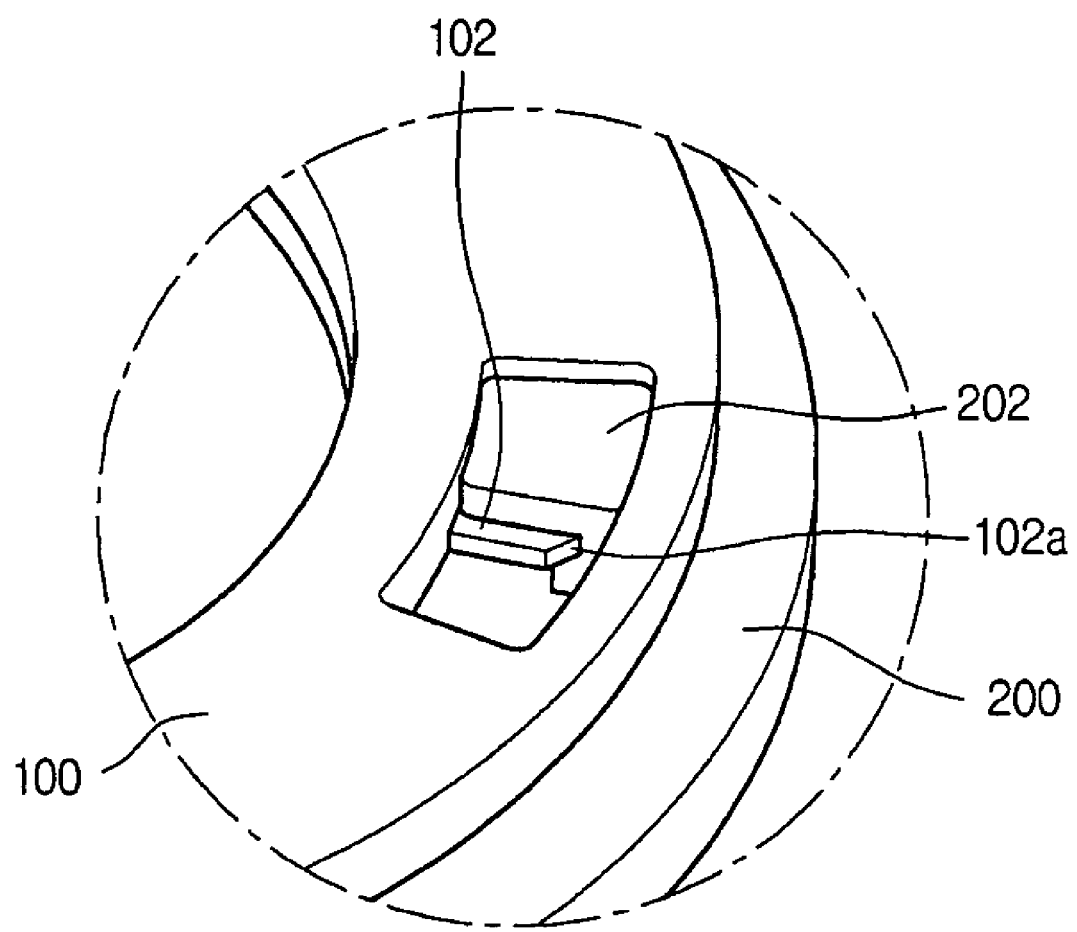
FIG. 7 illustrates that the clamp plate illustrated in FIGS. 5A and 5B and the turntable illustrated in FIGS. 6A and 6B are combined with each other.

The fixing protrusions 102 formed in the fastening holes 101 illustrated in FIGS. 5A and 5B are assembled with the fixing jaws 202 formed in the assembly groove 201 of the turntable 200 illustrated in FIGS. 6A and 6B to be fastened to the fixing jaws 202, which will be described with reference to FIG. 7. FIG. 7 illustrates that the clamp plate illustrated in FIGS. 5A and 5B and the turntable illustrated in FIGS. 6A and 6B are combined with each other.

As illustrated in FIG. 7, the fixing protrusions 102 formed in the fastening holes 101 of the clamp plate 100 are assembled with the fixing jaws 202 formed in the region of the assembly groove 201 of the turntable 200.

The clamp plate 100 and the turntable 200 may be fastened to each other through the following processes. First, the clamp plate 100 is inserted into the assembly groove 201 of the turntable 200. At this time, the fixing jaws 202 are positioned in the region in which the fastening holes 101 are formed. Then, the clamp plate 100 is rotated so that the fixing jaws 202 inserted into the fastening holes 101 are fastened to the fixing protrusions 102 formed in the clamp plate 100.

The protruding units 102a are formed at the edges of the fixing protrusions 102 so that the fixing protrusions 102 are fastened to the fixing jaws 202 of the turntable 200 to be fixed to the fixing jaws 202 by the rotation of the clamp plate 100. Therefore, the protruding units 102a of the clamp plate 100 are fastened to the fixing jaws 202 of the turntable 200 to prevent the turntable 200 from floating. The fixing protrusions 102 and/or the fixing jaws 202 are formed to have elastic deformation power in the vertical direction (radial direction) to the rotation direction of the clamp plate 100 so that the protruding units 102a of the fixing protrusions 102 and the fixing jaws 202 are easily fastened to each other.

Since the fixing jaws 202 and the protruding units 102a of the fixing protrusions 102 are engaged with each other to be fastened to each other in the direction of rotation of the turntable 200, the fixing jaws 202 and the protruding units 102a of the fixing protrusions 102 are not separated from each other when the turntable 200 rotates.

As described above, according to the present invention, it is possible to easily fasten the fixing protrusions 102 formed in the clamp plate 100 to the fixing jaws 202 formed in the turntable 200. Also, it is possible to firmly assemble the fixing protrusions 102 and the fixing jaws 202 with each other by the simple rotation of the clamp plate 100 and to simplify the assembly processes of the clamp plate 100 and the turntable 200.

Also, when a jig is used, it is possible to easily separate the fixing protrusions 102 from the fixing jaws 202 as well as to easily assemble the fixing protrusions 102 and the fixing jaws 202 with each other. Therefore, when an assembled product has defects, it is not necessary to abandon the turntable 200 and the clamp plate 100 combined with each other and it is possible to re-use the turntable 200 and the clamp plate 100 by separating the turntable 200 from the clamp plate 100.

On the other hand, the optical disc driver that includes the turntable 200 and the clamp plate 100 further includes the following elements. A clamper driven up and down is further positioned on the turntable 200 so that it is possible to prevent the loaded optical recording medium from deviating.

The clamper is formed so that mutual attraction is applied between the clamper and the clamp plate 100, which can be easily realized by a magnet. A clamp magnet may be formed in the clamper and the clamp plate 100 and the clamp magnet may be inserted into the turntable 200. At this time, the clamp magnet may be stacked in the assembly groove 201 of the turntable 200 together with the clamp plate 100.

The optical disc driver according to the present invention further includes the following elements for the driving thereof and signal interpretations. Since such elements are well known, the elements will be simply described.

The optical disc driver according to the present invention includes an RF signal processing unit, a servo unit, a CD-DA data processing unit, a DVD data processing unit, a CD-ROM decoder, an interface controller, an access controller, a system controller, and a mechanism unit.

The RF signal processing unit generates data signals and optical pickup servo error signal from the signals read by an optical pickup. The servo unit is composed of an optical pickup servo circuit, a transfer motor servo circuit, and a spindle motor servo circuit.

The CD-DA data processing unit 8/14 demodulates reproduced CD-DA data signals and corrects errors. The DVD data processing unit 8-16 demodulates reproduced DVD data signals, corrects Reed-Solomon product code (RS-PC) errors, and generates mutual authentication and cipher data in order to protect copyright.

The CD-ROM decoder detects CD-ROM synchronization, performs descramble, detects headers, and corrects errors. The interface controller controls buffer RAM and host interface.

The access controller controls a feed motor and track jump for high speed access. The system controller totally controls the operation of the entire drive. The mechanism unit includes an optical pickup, a spindle motor, an optical pickup transfer device, and a tray loading device.

As described above, according to the optical disc driver of the present invention, the fixing protrusions are formed in the region of the fastening holes of the clamp plate and the fixing jaws that can be fastened to the fixing protrusions are formed in the region of the assembly groove of the turntable to correspond to the fixing protrusions so that it is possible to easily assemble the turntable and the clamp plate with each other and to improve fastening power.

What is claimed is:

1. An optical disc driver comprising:
    a clamp plate including at least one fastening holes formed on the circumference thereof and fixing protrusions formed in the fastening holes;
    a turntable including an assembly groove into which the clamp plate is inserted and at least one fixing jaws formed in the assembly groove to be fastened to the fixing protrusions of the clamp plate.

2. The optical disc driver as claimed in claim 1, wherein the assembly groove is ring-shaped.

3. The optical disc driver as claimed in claim 2, wherein the fixing jaws are distributed on the circumference of the ring-shaped assembly groove at uniform angle.

4. The optical disc driver as claimed in claim 1, wherein the number of fixing jaws is no less than 3.

5. The optical disc driver as claimed in claim 1, wherein the fixing jaw is ¬-shaped or hook-shaped.

6. The optical disc driver as claimed in claim 1, wherein the fixing jaws of the turntable are inserted into the fastening holes of the clamp plate.

7. The optical disc driver as claimed in claim 1, wherein a protruding unit is further comprised in one end of each of the fixing protrusions of the clamp plate.

8. The optical disc driver as claimed in claim 7, wherein the protruding units of the clamp plate are fastened to the fixing jaws of the turntable to prevent the turntable from floating.

9. The optical disc driver as claimed in claim 7, wherein the clamp plate is inserted into the assembly groove of the turntable and then, the clamp plate is rotated so that the protruding units of the clamp plate and the fixing jaws of the turntable are fastened to each other.

10. The optical disc driver as claimed in claim 9, wherein the fixing protrusions and/or the fixing jaws have elastic deformation power in the vertical direction (radial direction) of the clamp plate's rotation direction.

11. The optical disc driver as claimed in claim 1, further comprising a clamper positioned on the turntable to prevent an optical recording medium loaded on the turntable from deviating.

12. The optical disc driver as claimed in claim 11, wherein the clamper comprises a clamp magnet that attracts the clamp plate.

13. The optical disc driver as claimed in claim 11, further comprising a clamp magnet that attracts the clamp in the assembly groove of the turntable.

14. The optical disc driver as claimed in claim 13, wherein the clamp magnet is stacked on the clamp plate.

15. The optical disc driver as claimed in claim 11, wherein the optical recording medium is an optical disc.

* * * * *